(12) United States Patent
Yeo

(10) Patent No.: US 6,226,577 B1
(45) Date of Patent: May 1, 2001

(54) METHOD FOR SEARCHING TRIP LOG OF VEHICLE

(75) Inventor: Jung-hack Yeo, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/466,019

(22) Filed: Dec. 17, 1999

(30) Foreign Application Priority Data

Jul. 8, 1999 (KR) .................................................. 99-27520

(51) Int. Cl.[7] .................................................. G01C 21/00
(52) U.S. Cl. .............................. 701/35; 701/29; 701/119; 340/441
(58) Field of Search ................................ 701/35, 29, 117, 701/118, 119; 340/441, 439, 436; 707/10, 102, 104

(56) References Cited

U.S. PATENT DOCUMENTS

| | | | |
|---|---|---|---|
| 5,550,738 | * | 8/1996 | Bailey et al. ........................... 701/35 |
| 5,857,986 | * | 9/1999 | Boverdill ............................... 701/35 |
| 5,893,893 | * | 4/1999 | Holt et al. .............................. 701/35 |

* cited by examiner

*Primary Examiner*—Tan Nguyen
(74) *Attorney, Agent, or Firm*—Christie, Parker & Hale, LLP

(57) ABSTRACT

A method for searching a trip log of a vehicle. The method includes the steps of inputting a vehicle number of a vehicle and a desired search date; displaying trip log information of the vehicle in a graph format and through numerical information; enlarging or reducing the graph to view a desired time interval; pinpointing specific time to view information; and searching trip log information of the vehicle for a prior or subsequent day.

4 Claims, 6 Drawing Sheets

METHOD FOR SEARCHING TRIP LOG OF VEHICLE

BACKGROUND OF THE INVENTION (a) Field of the Invention

The present invention relates to a method for searching a trip log of a vehicle, and more particularly, to a method for searching a trip log of a vehicle in which a trip log, stored in data files received through communications between a trip recorder and a personal computer, can be searched in detail.

(b) Description of the Related Art

A trip log recorder is typically an analog device (mechanical or electrical) that records various information related to driving states of a vehicle. Such trip log recorders are often used in commercial vehicles such as trucks to enable the vehicle fleet manager to better oversee the vehicles and drivers, including keeping track of possible law violations. Trip log recorders generally are capable of providing a printout of recorded information such as vehicle speed, mileage, times and duration of stops, etc. Recording results are provided in periodic intervals of, for example, 3, 6, 12 or 24 hours.

In some areas, records produced by the analog trip log recorder must, by law, be kept for a set period of time such as one year. Accordingly, managers of commercial vehicles keep these paper printouts of each vehicle in the fleet. This can result in substantial amounts of paper records, especially in the case where the company has a large fleet of vehicles.

Further, data that is not automatically recorded by the trip log recorder must be written in by hand by the driver or some other employee. Also, with such analog systems, only 24 hours of information may be recorded on one printout. Accordingly, if the printout paper is not replaced, redundant recordal results. In addition, it is not possible to provide data in different formats such as travelling speed and distance on the basis of time.

SUMMARY OF THE INVENTION

The present invention has been made in an effort to solve the above problems.

It is an object of the present invention to provide a method for searching a trip log of a vehicle in which a trip log can be easily searched.

It is another object of the present invention to provide a method for searching a trip log of a vehicle in a which data of a trip log can be selectively searched such as searching speeds and distances that the vehicle was driven at specific times.

To achieve the above objects, the present invention provides a method for searching a trip log of a vehicle. The method includes the steps of inputting a vehicle number of a vehicle and a desired search date; displaying trip log information of the vehicle in a graph format and through numerical information; enlarging or reducing the graph to view a desired time interval; pinpointing specific time to view information; and searching trip log information of the vehicle for a prior or subsequent day.

According to a feature of the present invention, the method further includes the steps of searching speed limit violations; searching stopped times of the vehicle; and searching various other information.

According to another feature of the present invention, the graph displays speeds and distance over a 24-hour period.

According to yet another feature of the present invention, the step of enlarging or reducing the graph to view a desired time interval can be performed to any time interval up to 24 hours and down to a one-hour time interval.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
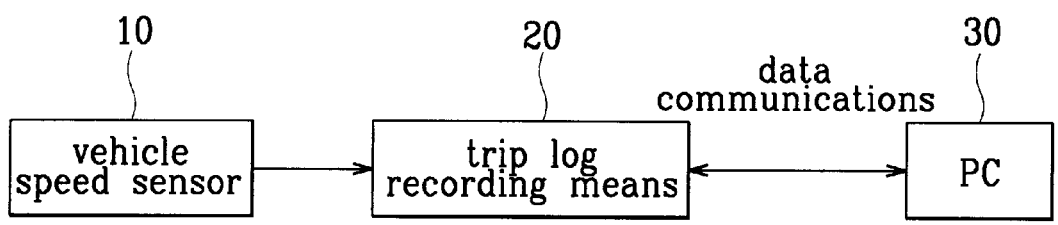
FIG. 1 is a block diagram of a trip log recorder to which the present invention is applied.

FIG. 1 is a block diagram of a trip log recorder to which the present invention is applied. The trip log recorder comprises a vehicle speed sensor 10 for detecting vehicle speed and outputting corresponding signals; trip log recording means 20 receiving the signals from the vehicle speed sensor 10 and storing the signals in a memory as data based on time; and a PC 30 connected to and performing data communications with the trip log recording means 20 to receive and display trip log information stored in the memory of the trip log recording means 20, and for recording trip log information to create data files that can be searched and otherwise accessed.

The trip log recording means 20 is disclosed in Korean Patent Application No. 99-4411 (filed on Feb. 9, 1999). The trip log recording means 20 includes a selector switch manipulated by the driver to select the desired information to be recorded; a calendar integrated circuit for clocking the year, month, day and time; a microcomputer receiving signals from the vehicle speed sensor 10 and the selector switch, and performing control based on these signals using a pre-installed program; a memory receiving output signals from the microcomputer and storing the signals as trip log information; a display receiving output signals from the microcomputer, and displaying time and vehicle driving state information; and a communications unit enabling communications with the display and an external communications unit.

Figure 2:
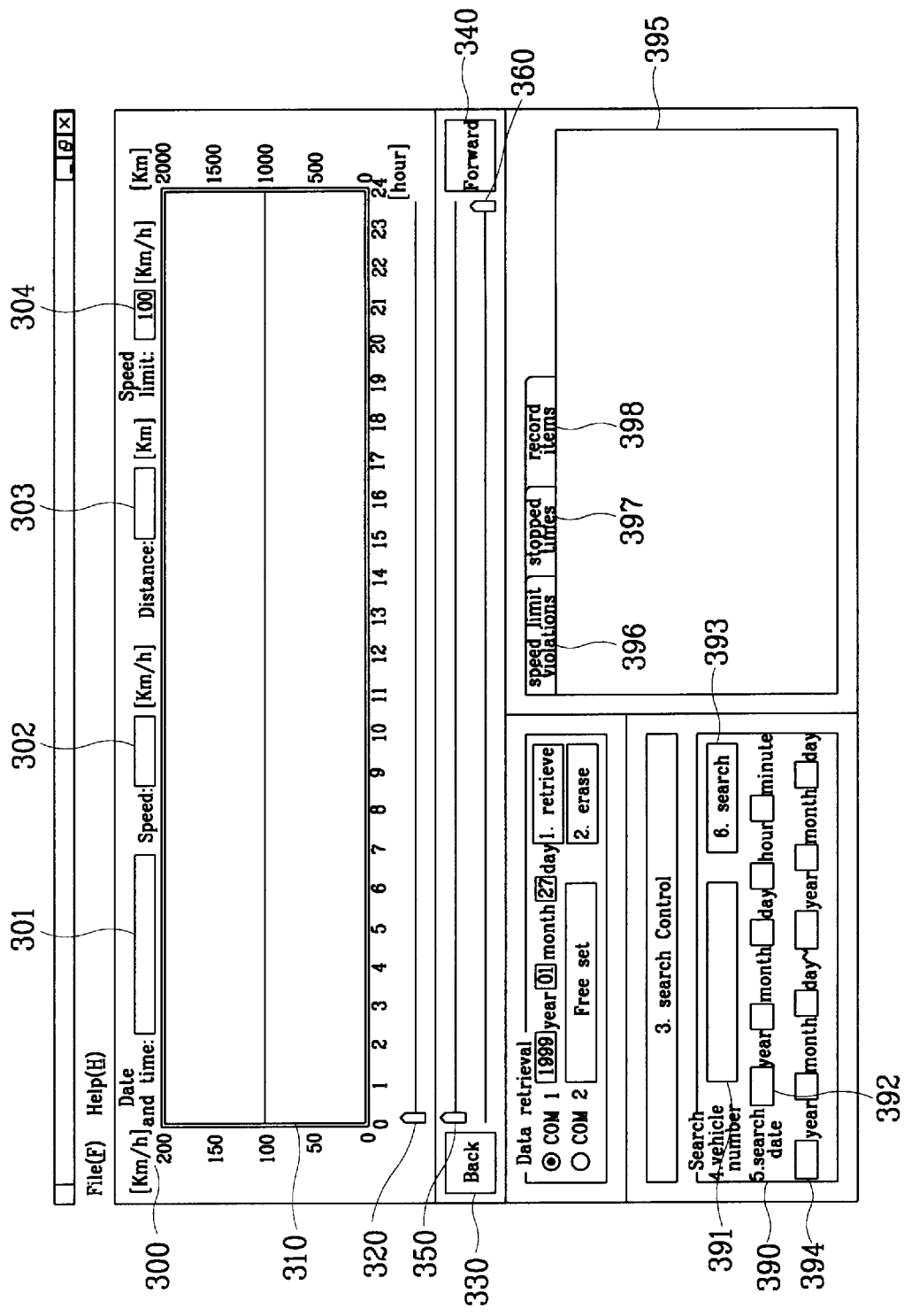
FIG. 2 is a schematic drawing of an initialization screen of the trip log recorder shown in FIG. 1.

An initialization screen appearing on a display of the PC 30, with reference to FIG. 2, includes a driving state display portion 300 which displays various information of the vehicle driving state; a graph display portion 310 for displaying through graphs speed and distance at times over a 24-hour period; a first search bar 320 which enables the user to determine the speed at which the vehicle was driven for a specific time; a first select switch 330 which when activated by the user compares the previous day's records with those of the day presently being viewed; a second select switch 340 which when activated by the user compares the following day's records with those of the day presently being viewed; a second search bar 350 and a third search bar 360 for enlarging and reducing the screen displayed by the graph display portion 310; a search control portion 390 through which the user selects the vehicle and date desired for searching; and an auxiliary information portion 395 which displays additional trip log information.

The driving state display portion 300 includes a time indicator 301 for displaying the date (e.g., mm/dd/yy), hour, minute and second; a speed indicator 302 for displaying a speed of the vehicle; a distance indicator 303 for displaying a total distance of the vehicle; and a speed limit input field 304 where the speed limit is input.

The search control portion 390 includes a vehicle number input field 391 where pre-established vehicle numbers are input; a search date input field 392 where the date that the user desires to conduct the search is input; a search bar 393 which is activated by the user to begin the search operation; and a search date interval input field 394 where an interval of time that the user desires to conduct the search is input.

The auxiliary information portion 395 includes a speed limit violations folder 396 which when selected by the user displays information of when the vehicle surpassed the speed limit; a stopped times folder 397 which when selected by the user displays information of when the vehicle was stopped; and a recorded items folder which when selected by the user displays information of various recorded items.

Figure 3:
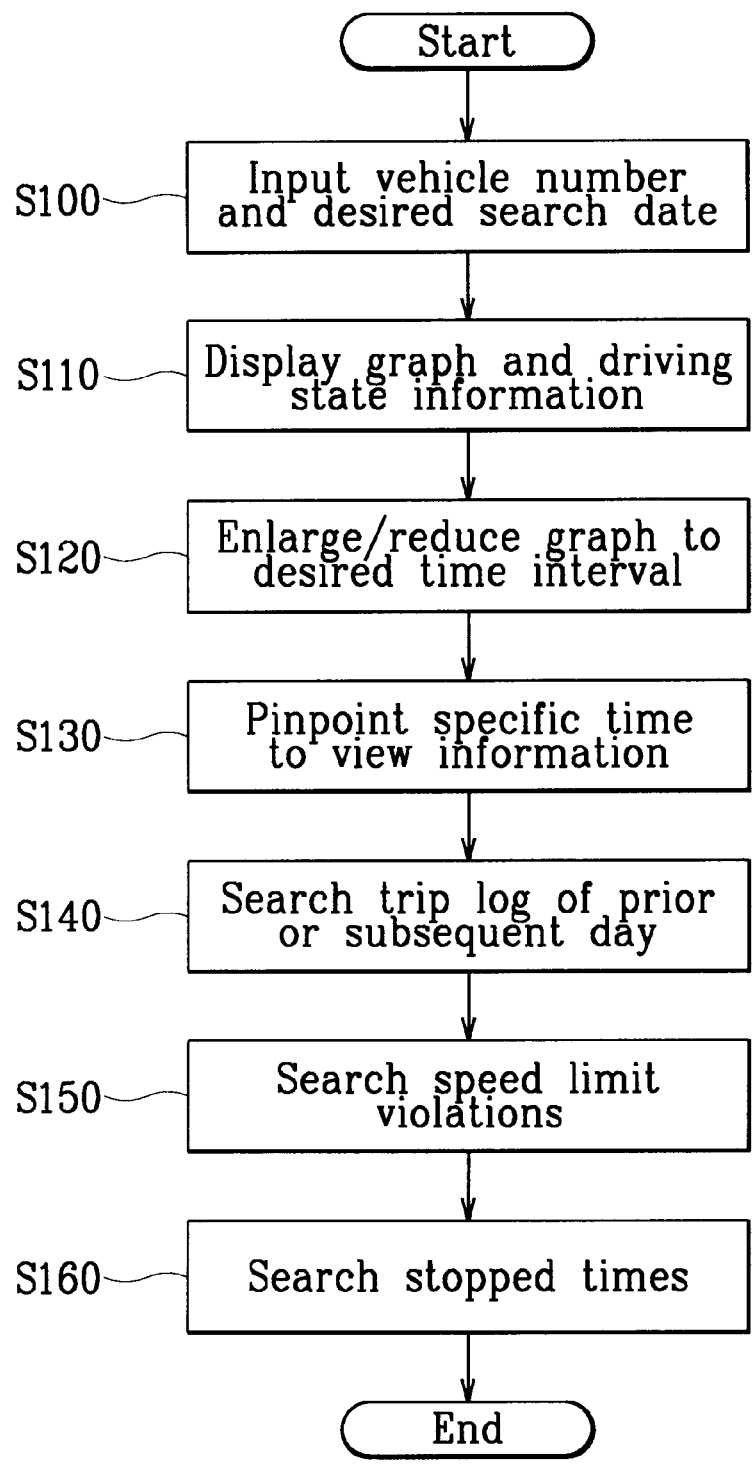
FIG. 3 is a flow chart of a method for searching a trip log of a vehicle according to a preferred embodiment of the present invention.

FIG. 3 shows a flow chart of a method for searching a trip log of a vehicle according to a preferred embodiment of the present invention.

Before the method begins, the PC 30 is connected to the trip log recording means 20 via RS-232C data communications such that trip log information stored in the memory of the trip log recording means 20 is transmitted to the PC 30, thereby storing the trip log information according to the vehicle number in the PC 30. When desiring to search the information stored in the PC 30 by vehicle number, the search program installed in the PC 30 is initiated by the user, resulting in the initialization screen as shown in FIG. 2 appearing on the display of the PC 30.

Figure 4:
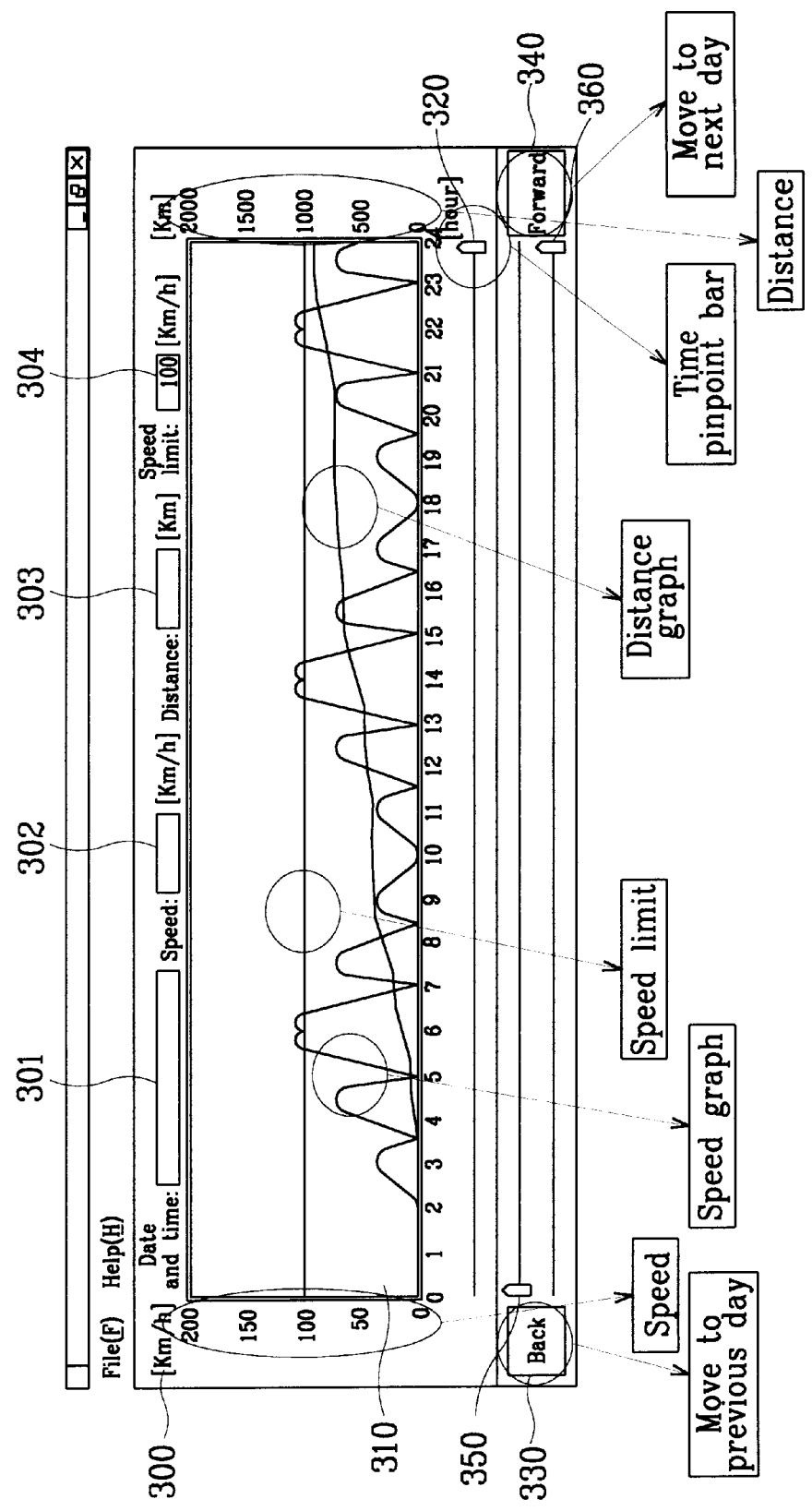
FIG. 4 is a schematic drawing of a screen displaying speed and distance on the basis of time over a 24-hour period.

First, the vehicle number corresponding to the data of the vehicle that the user desires to search is input in the vehicle number input field 391 of the search control portion 390, and the date on which the user desires to conduct the search is input in the search date input field 392 in step S100. Next, if the search bar 393 is activated by the user, the PC 30 displays the screen as shown in FIG. 4 in step S110. That is, a graph as that shown in the drawing appears in the graph display portion 310, and the driving state display portion 300 is filled in with the relevant information. At this time, if the user inputs the speed limit in the speed limit input field 304 of the driving state display portion 300, a corresponding horizontal line appears on the graph display portion 310, enabling the user to quickly check for speed limit violations.

Figure 5:
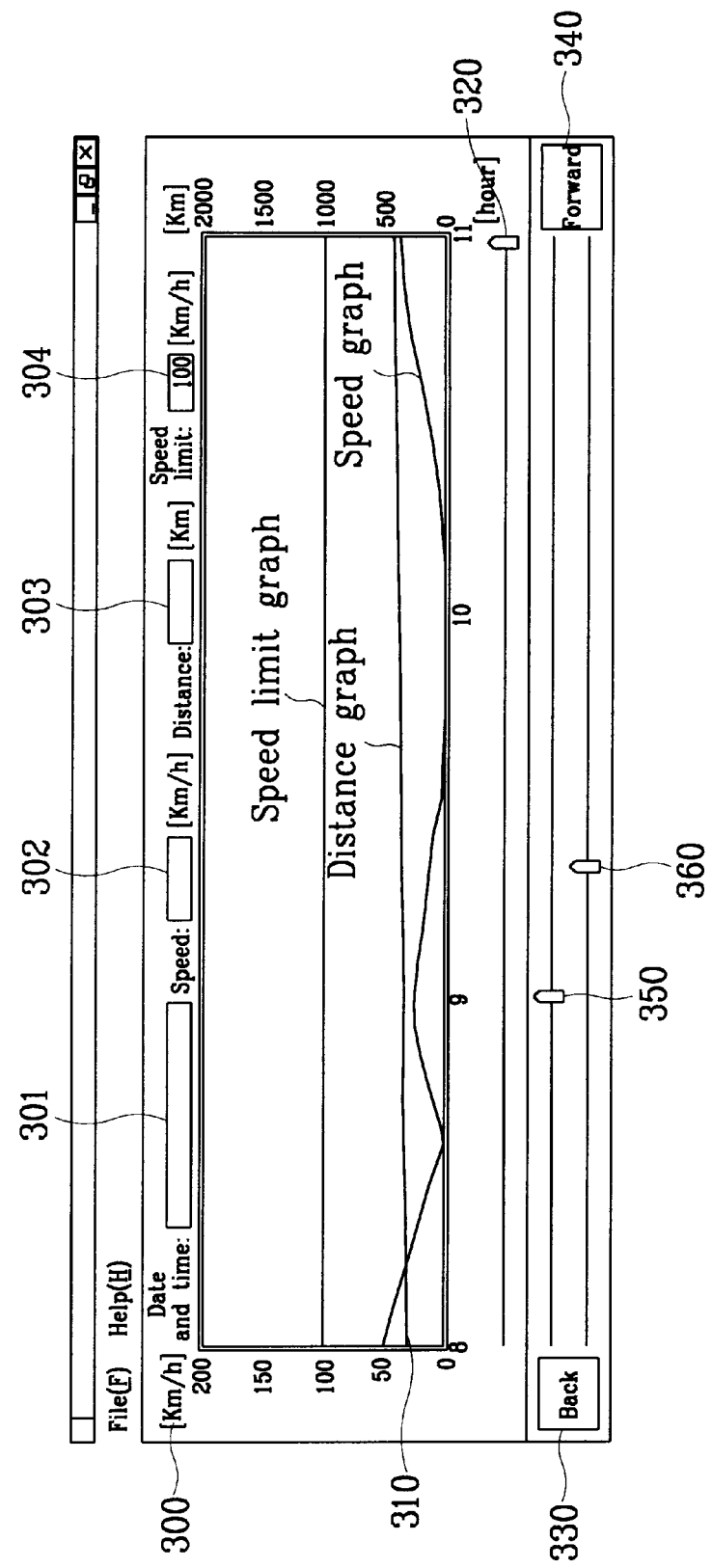
FIG. 5 is a schematic drawing of the screen shown in FIG. 4 used to illustrate an enlargement/reduction function.

Next, if the user desires to view a certain portion of the graph in more detail, the second and third search bars 350 and 360 are manipulated to the desired reduction amount such that a graph as that shown in FIG. 5 appears on the graph display portion 310 in step S120. As shown in FIG. 5, the graph is reduced such that only an interval of time between 8 and 11 is shown, thereby allowing the user to more easily examine vehicle speed and distance in this interval. The second and third search bars 350 and 360 can be altered in this manner to display on the graph display portion 310 any interval of time in the 24-hour period, down to a minimum of a one-hour interval.

Figure 6:
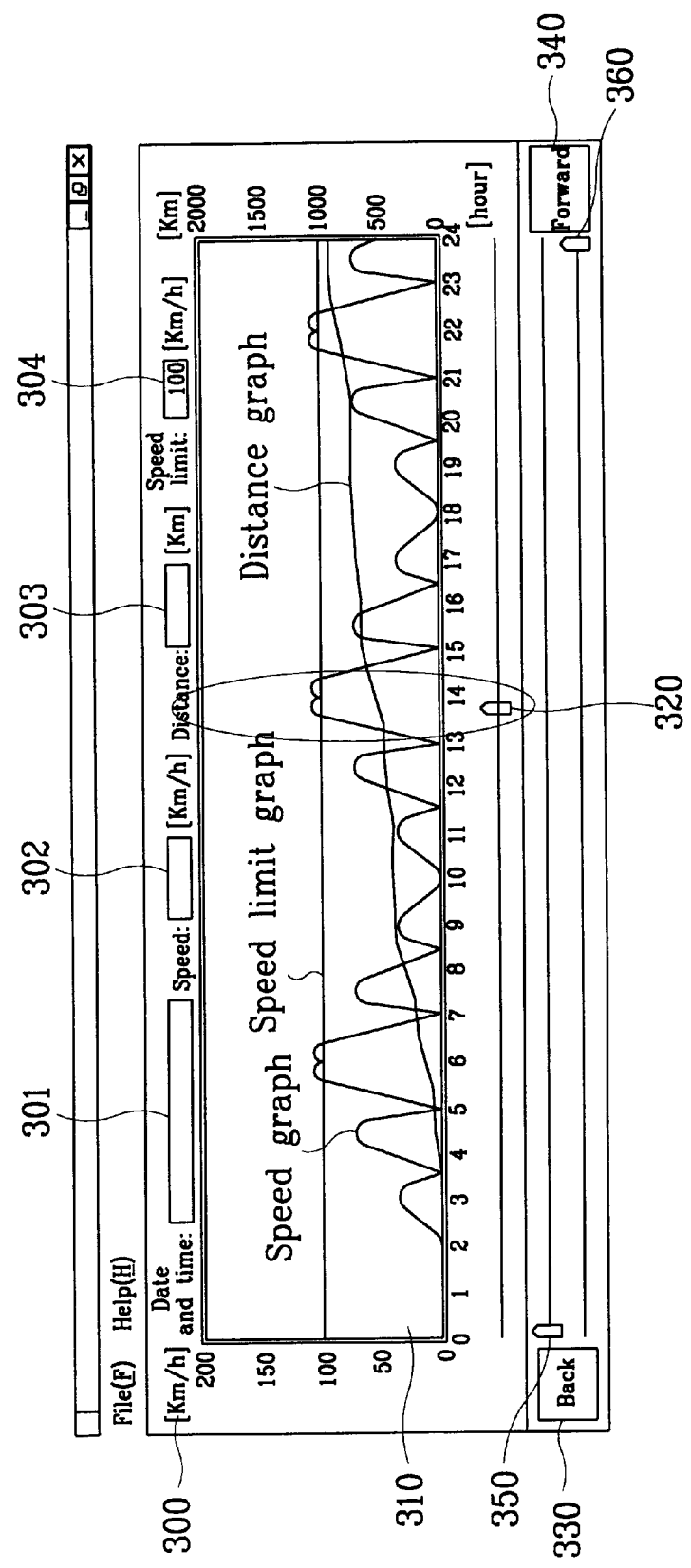
FIG. 6 is a schematic drawing of the screen shown in FIG. 4 used to illustrate a time pinpoint function.

Subsequently, if the user desires to examine one, specific time in the graph appearing in the graph display portion, the first search bar 320 is manipulated to the desired time in step S130. Accordingly, a vertical line, as that shown in FIG. 6, appears on the graph of the graph display portion 310 and all the relevant information appears in the fields of the driving state display portion 300. So, for example, the exact time, speed and distance at which the vehicle exceeded the speed limit can easily known by the user.

Following the above, if the user activates either the first select switch 330 or the second select switch 340, trip log information respectively prior or subsequent to the day presently being displayed appears on the driving state display portion 300 and the graph display portion 310 in step S140. Here, it is preferable that the first select switch 330 is marked as "back" and the second select switch 340 as "forward".

Next, if the user desires to view information related to speed limit violations, the user activates the speed limit violations folder 396 of the auxiliary information portion 395 such that information of speed limit violations is provided to the user in step S150. Next, if the user desires to view information of when the vehicle was stopped, the user activates the stopped times folder 397 of the auxiliary information portion 395 to retrieve information of when the vehicle was stopped in step S160. At this time, it is also possible for the user to view information in the record times folder 398 to view various other information such as vehicle start and stop times, driver names, etc.

In the method for searching a trip log of a vehicle of the present invention described above, there are many advantages over the prior art methods: overall costs are reduced as print-out paper is not used; trip log information is simply searched; searching trip log information according to date and exact time is possible; trip log information can be searched in a way that is easy to comprehend by the user; and searching trip log information is fast.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for searching a trip log of a vehicle comprising the steps of:

inputting a vehicle number of a vehicle and a desired search date;

displaying trip log information of the vehicle in a graph format and through numerical information;

enlarging or reducing the graph to view a desired time interval and running range during the time interval;

pinpointing specific time to view information; and searching trip log information of the vehicle for a prior or subsequent day.

2. The method of claim 1 further comprising the steps of:

searching speed limit violations;

searching stopped times of the vehicle; and searching various other information.

3. The method of claim 1 wherein the graph displays speeds and distance over a 24-hour period.

4. The method of claim 1 wherein the step of enlarging or reducing the graph to view a desired time interval and running range during the time interval can be performed to any time interval up to 24 hours and down to a one-hour time interval.

* * * * *